US012798757B2

(12) United States Patent
Schlipf

(10) Patent No.: US 12,798,757 B2
(45) Date of Patent: Nov. 17, 2026

(54) SLAT COVE FILLING DEVICE FOR A SLAT OF AN AIRCRAFT, ASSOCIATED SLAT, WING, AIRCRAFT AND METHOD OF RECONFIGURING A WING

(71) Applicant: Airbus Operations GmbH, Hamburg (DE)

(72) Inventor: Bernhard Schlipf, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 19/412,282

(22) Filed: Dec. 8, 2025

(65) Prior Publication Data

US 2026/0159219 A1 Jun. 11, 2026

(30) Foreign Application Priority Data

Dec. 11, 2024 (DE) ........................ 102024137083.1

(51) Int. Cl.
*B64C 3/26* (2006.01)
*B64C 3/38* (2006.01)

(52) U.S. Cl.
CPC . *B64C 3/26* (2013.01); *B64C 3/38* (2013.01)

(58) Field of Classification Search
CPC .... B64C 3/26; B64C 3/38; B64C 9/24; B64C 9/22; B64C 3/48; B64C 2230/14; Y02T 50/30; Y02T 50/10
See application file for complete search history.

(56) References Cited

U.S. PATENT DOCUMENTS 3,128,966 A * 4/1964 Alvarez-Calderon ........................ B64C 21/02 244/210
4,913,381 A * 4/1990 Mabey .................... B64C 23/06 416/235
5,050,822 A * 9/1991 Whitehouse .............. B64C 9/16 244/1 N
6,286,790 B1 * 9/2001 Thorpe ...................... B64C 9/24 244/214
6,394,396 B2 * 5/2002 Gleine ................... B64D 15/04 244/1 N
6,457,680 B1 * 10/2002 Dobrzynski .............. B64C 9/24 244/210
6,789,769 B2 * 9/2004 Mau ...................... B64C 23/005 244/214

(Continued)

FOREIGN PATENT DOCUMENTS

EP 3643616 B1 12/2021

OTHER PUBLICATIONS

German Search Report for DE 10 2024 137 083.1 dated Jul. 30, 2025, 8 pages.

*Primary Examiner* — Medhat Badawi
(74) *Attorney, Agent, or Firm* — Nixon & Vanderhye, PC

(57) ABSTRACT

A slat cove filling device for a slat of an aircraft is disclosed including a sheltering panel extending along a spanwise direction (Y) and comprising a proximal edge (50), configured for being fastened to a slat body of the slat, and a distal edge, configured for being slidable relative to the slat body. The sheltering panel includes guiding passages, each guiding passage being configured for cooperating with a guiding element of the slat body for guiding the distal edge along a sliding direction (S) relative to the slat body.

15 Claims, 6 Drawing Sheets

(56) References Cited

U.S. PATENT DOCUMENTS 7,766,281 B2 * 8/2010 Lorkowski ................ B64C 3/50 244/210
8,118,265 B2 * 2/2012 Ferrari ...................... B64C 3/58 244/214
8,353,483 B2 * 1/2013 Dodd ........................ B64C 3/28 244/214
8,424,810 B1 * 4/2013 Shmilovich ............... B64C 9/24 244/214
8,534,610 B1 * 9/2013 Pitt ........................... B64C 9/22 244/214
8,864,083 B1 * 10/2014 Shmilovich ............... B64C 9/24 244/215
9,242,720 B2 * 1/2016 Turner ...................... B64C 9/22
11,427,303 B2 * 8/2022 Dos Reis ................ B64C 21/02
11,840,331 B2 * 12/2023 Gartelmann ............ B64C 13/30
12,017,771 B2 * 6/2024 Turner ...................... B64C 9/08
12,466,539 B2 * 11/2025 Fees .......................... B64C 3/28
12,565,306 B2 * 3/2026 Kamila ..................... B64C 9/22
2004/0169110 A1 * 9/2004 Wyrembek ............... B64C 9/32 244/113
2011/0240803 A1 * 10/2011 Shmilovich ............... B64C 9/24 244/214
2012/0049533 A1 * 3/2012 Kelly ........................ F03D 9/25 290/55
2012/0061523 A1 * 3/2012 Havar ....................... B64C 9/24 244/214
2012/0097791 A1 * 4/2012 Turner ...................... B64C 9/24 244/1 N
2013/0052014 A1 * 2/2013 Kelly ........................ F03D 5/04 416/66
2015/0210379 A1 * 7/2015 Henning ................... B64C 9/22 244/214
2015/0259061 A1 * 9/2015 Brakes ...................... B64C 3/50 244/214
2016/0375987 A1 * 12/2016 Shmilovich ............. B64C 21/04 244/207
2017/0152018 A1 * 6/2017 Kawai ....................... B64C 3/28
2017/0174313 A1 * 6/2017 Brakes .................... B64C 25/00
2020/0140065 A1 * 5/2020 Hui ......................... B64C 21/00
2020/0164961 A1 * 5/2020 Bensmann ................ B64C 9/24
2020/0164964 A1 * 5/2020 Brakes .................... B64C 13/16
2020/0277039 A1 * 9/2020 Bensmann ............. B64C 3/185
2020/0346738 A1 * 11/2020 Erban ....................... B64C 3/50
2021/0009257 A1 * 1/2021 Shmilovich ............... B64C 9/22
2021/0070422 A1 * 3/2021 Dos Reis ................ B64C 21/02
2022/0111951 A1 * 4/2022 Shmilovich ............. B64C 21/04
2022/0306278 A1 * 9/2022 Daandels .................. B64C 3/26
2023/0002030 A1 * 1/2023 Jara Rodelgo ............ B64C 3/48
2024/0174351 A1 * 5/2024 Kelly ...................... B64C 1/065
2024/0217648 A1 * 7/2024 Schlipf .................. B64D 37/04
2024/0417065 A1 * 12/2024 Kirk ...................... B64C 21/025
2025/0115349 A1 * 4/2025 Castrichini ............. B64C 9/323
2025/0282469 A1 * 9/2025 Schlipf ..................... B64C 3/44
2026/0152277 A1 * 6/2026 Evans ....................... B64C 3/28
2026/0159219 A1 * 6/2026 Schlipf ..................... B64C 3/26
2026/0159228 A1 * 6/2026 Bondarchuk ............. B64C 9/22
2026/0167318 A1 * 6/2026 Sauven ..................... B64C 3/14
2026/0167322 A1 * 6/2026 Schlipf ..................... B64C 9/24

* cited by examiner

SLAT COVE FILLING DEVICE FOR A SLAT OF AN AIRCRAFT, ASSOCIATED SLAT, WING, AIRCRAFT AND METHOD OF RECONFIGURING A WING

CROSS REFERENCE TO RELATED APPLICATION

This application claims priority to German Application DE 10 2024 137 083.1, filed Dec. 11, 2024, the entire contents of which is hereby incorporated by reference.

BACKGROUND

The present disclosure relates to a slat cove filling device of an aircraft. The present disclosure also relates to a slat comprising such slat cove filling device. The present disclosure further relates to a wing, comprising such a slat and to an aircraft, comprising such a wing. The present disclosure also relates to a method of reconfiguring a wing as above mentioned.

In the domain of slat of aircraft, one knows that the slat cove, that is the concave trailing edge side of the slat, can be prone to turbulent airflow. The slat cove of a slat is generally filled by a leading edge of a fixed wing portion when the slat is in a stowed position. However, when the slat is deployed, the slat cove is exposed to an ambient airflow. Such an ambient airflow can penetrate the slat cove and due to the shape and position of the slat cove, this generally results in a turbulent airflow at the slat cove. Such slat coves are thus generally generating undesired drag when the slat is deployed but are also generating some undesired noise.

It has therefore been proposed to use slat cove fillers to fill the cove of slats, in particular when slats are deployed.

Known solution rely for example on slat cove filling devices relying on a flexible panel, that can be deformed to allow the slat to be stowed relative to a wing of the aircraft, but which can also elastically deform such that the flexible panel fill the slat cove when the slat is deployed. In know solutions, the flexible panel is for example only supported at the trailing edge of a body of the slat and the opposite end of the flexible panel is cooperating freely with a body of the slat.

Such solution is however not entirely satisfying. Indeed, the loads applied to such flexible panels can be significant and known slat cove filling devices are not robust enough to ensure satisfying safety of operation.

SUMMARY

The present disclosure encompasses a robust slat cove filling device which efficiently reduces drag and noise.

To this end, the disclosure relates a slat cove filling device for a slat of an aircraft, the slat cove filling device comprising a sheltering panel extending along a spanwise direction and comprising a proximal edge, configured for being fastened to a slat body of the slat, and a distal edge, configured for being slidable relative to the slat body, the sheltering panel comprising a plurality of guiding passages, each guiding passage being configured for cooperating with a guiding element of the slat body for guiding the distal edge along a sliding direction relative to the slat body.

The use of a slat cove filling device which comprises a sheltering panel with a plurality of guiding passages, and in which each guiding passages is configured such that the distal edge of the sheltering panel is guided along a sliding direction is especially advantageous since it allows the slat cove filling device to properly move in order to fill the slat cove when the slat is in a deployed position, while ensuring that the displacement of the slat cove filling device is controlled and that the loads applied to this device are limited.

According to other advantageous aspects of the disclosure, the slat cove filling device comprises one or more of the following features taken alone or according to all technically possible combinations:

- the sheltering panel is flexible and configured for being deformable between the slat body and a fixed wing portion of the aircraft upon displacement of the slat body relative to the fixed wing portion of the aircraft;
- the guiding passages are elongated along the sliding direction, the sliding direction being substantially perpendicular to the spanwise direction;
- the plurality of guiding passages is adjacent to the distal edge, each guiding passage being formed by an elongated hole or a notch;
- the slat cove filling device further comprises at least one limiting element, the limiting element being connected to the sheltering panel and configured for cooperating with the slat body to limit displacement of the distal edge relative to the slat body along the sliding direction; and
- the limiting element comprises an elastic tongue, a tip of the elastic tongue being configured for cooperating with the slat body to limit the displacement of the distal edge relative to the slat body.

The disclosure also relates to a slat comprising a slat cove filling device as presented above, and a slat body, the proximal edge of the sheltering panel of the slat cove filling device being fastened to the slat body and the distal edge of said sheltering panel being slidable relative to the slat body, the slat body comprising a plurality of guiding elements, each guiding passage of the sheltering panel being configured for cooperating with one of the guiding elements for guiding the distal edge along the sliding direction relative to the slat body.

According to other advantageous aspects of the disclosure, the slat comprises one or more of the following features taken alone or according to all technically possible combinations:

- the slat body comprises an external skin and an internal skin, the sheltering panel being configured to slide between the internal and the external skins such that the distal edge is sliding relative to the slat body;
- at least one of the guiding elements is connecting the internal and the external skins;
- the slat body comprises at least one spacer, the spacer being arranged between the internal skin and the external skin to space the internal skin apart of the external skin;
- the slat body comprises a plurality of spacers, each spacer being arranged around one the guiding elements, each said guiding element being configured for cooperating with one of the guiding passages through said spacer for guiding the distal edge along the sliding direction relative to the slat body; and
- the slat body further comprises at least one blocking element, the blocking element being connected to the internal skin and being configured for cooperating with the slat cove filling device for blocking displacement of the slat cove filling device along the sliding direction.

The disclosure also relates to a wing comprising a slat as presented above and a fixed wing portion, the slat being moveable relatively to the fixed wing portion between and deployed position and a stowed position, the distal edge of the sheltering panel of the slat cove filling device being configured for sliding relatively to the slat body upon moving the slat between its deployed and stowed positions.

The disclosure further relates to an aircraft comprising a wing as presented above.

The disclosure also relates to a method of reconfiguring a wing as presented above, wherein the method comprises the following steps:

moving the slat relatively to the fixed wing portion between its deployed and stowed positions, and sliding of the distal edge of the sheltering panel of the slat cove filling device relatively to the slat body, the sliding of the distal edge being guided along a sliding direction relative to the slat body, the sliding direction being defined by the guiding passages of the sheltering panel.

BRIEF DESCRIPTION OF THE DRAWINGS

The disclosure will be better understood when reading the following description, which is given solely by way of example and with reference to the appended drawings.

DETAILED DESCRIPTION OF SOME EMBODIMENTS

Some embodiments will now be described with reference to the Figures.

Figure 1:
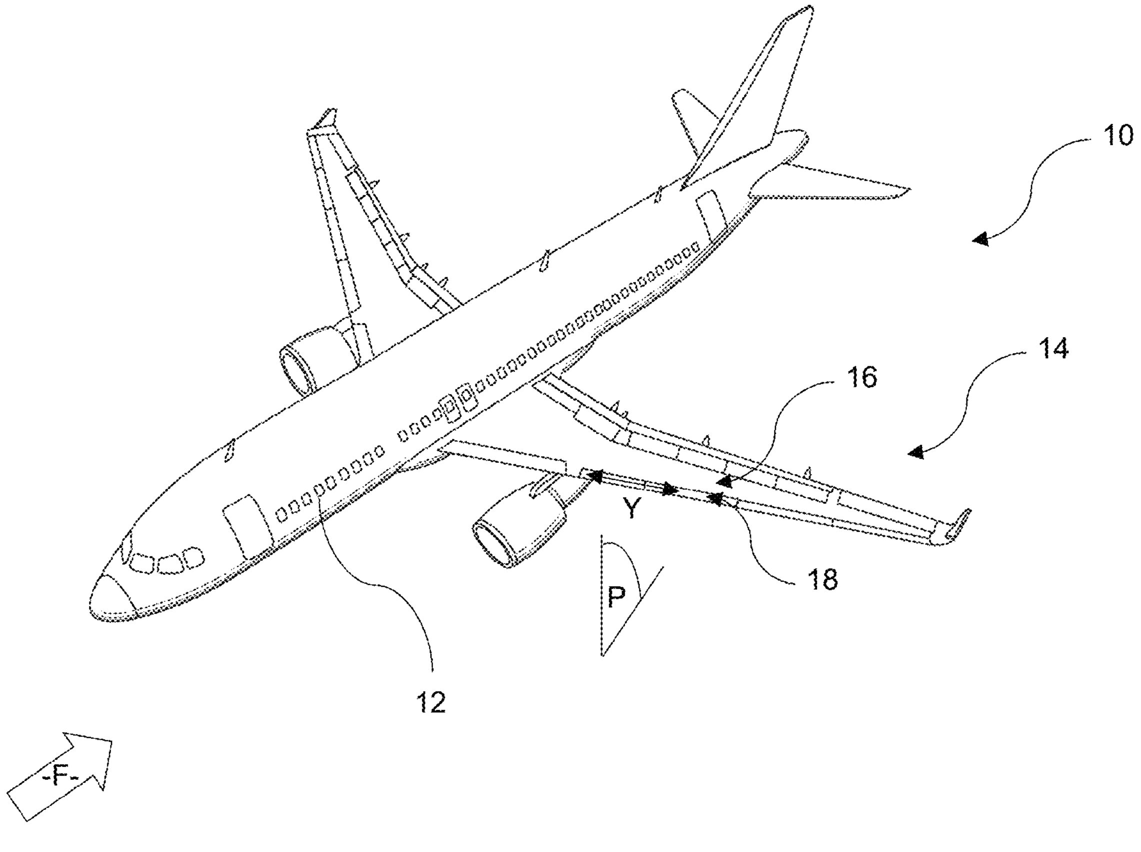
FIG. 1 is a schematic view of an aircraft comprising a wing with a slat according to an exemplary embodiment.

Referring to FIG. 1, an aircraft 10 comprises a fuselage 12 and two wings 14.

The aircraft 10 is for example an airplane and for example an airliner.

Each wing 14 comprises a fixed wing portion 16 and at least one slat 18.

As illustrated on FIG. 1, the fixed wing portion 16 comprises a leading edge 20. The leading edge 20 of the fixed wing portion 16 is for example facing the slat 18.

The slat 18 is arranged upstream an ambient airflow F of the fixed wing portion 16 when the aircraft 10 is flying. One thus understands that the slat 18 is for example part of a leading-edge high lift system.

As visible from FIG. 1, the slat 18 is for example elongated along a spanwise direction Y, the spanwise direction Y along which the slat 18 is elongated corresponding for example to a spanwise direction of the wing 14.

The slat 18 is moveable relatively to the fixed wing portion 16 between a deployed and a stowed position. When the slat 18 is in its deployed position, the slat 18 is for example further away from the fixed wing portion 16 than when it is in its stowed position.

The slat 18 is for example moveable in rotation and/or translation relative to the fixed wing portion between its deployed and stowed positions. In an example the slat is for example fastened to a curved track (non-illustrated) the curved track being moveable relative to the fixed wing portion 16 to move the slat between its deployed and stowed positions.

For example, the slat 18 is controlled to be in its deployed position when high lift is required, such as for example during take-off and/or landing of the aircraft 10, and is controlled to be in its stowed position when low drag is required, such as for example during cruise of the aircraft 10.

One understands that there might exist a plurality of deployed positions for the slat 18, the slat 18 being then moveable between its deployed positions and its stowed position.

Figure 2:
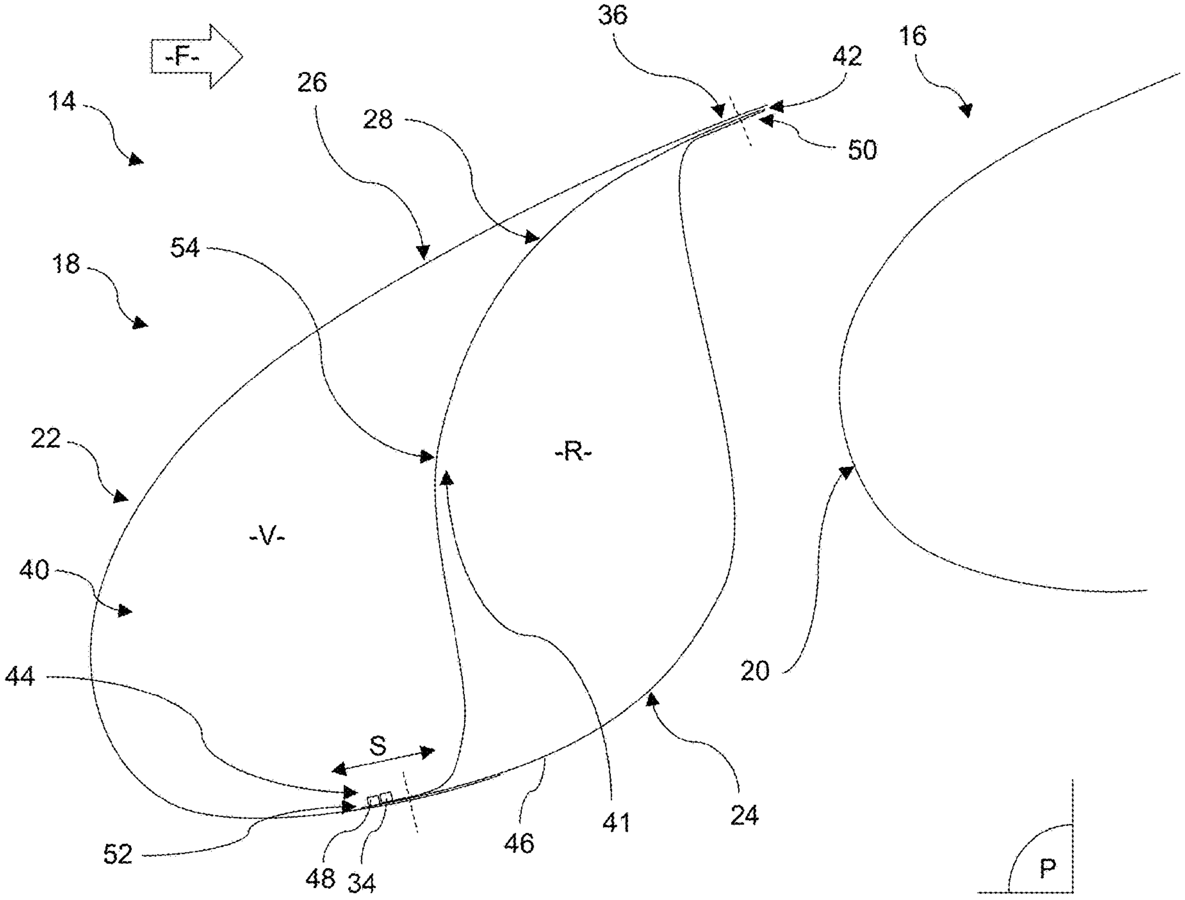
FIG. 2 is a schematic section view, taken along a section plane P, of the wing presented in FIG. 1, in which the slat cove filling device is visible and in which the slat is in a deployed configuration relative to a fixed wing portion of the wing.

As illustrated on FIG. 2, the slat 18 comprises a slat body 22 and a slat cove filling device 24. It is understood that FIG. 2 presents a profile of the slat 22 along a section plane P such that the slat body 22 and the slat cove filling device 24 are for example elongated along the spanwise direction Y, the spanwise direction Y being for example substantially perpendicular to section plane.

Figure 3:
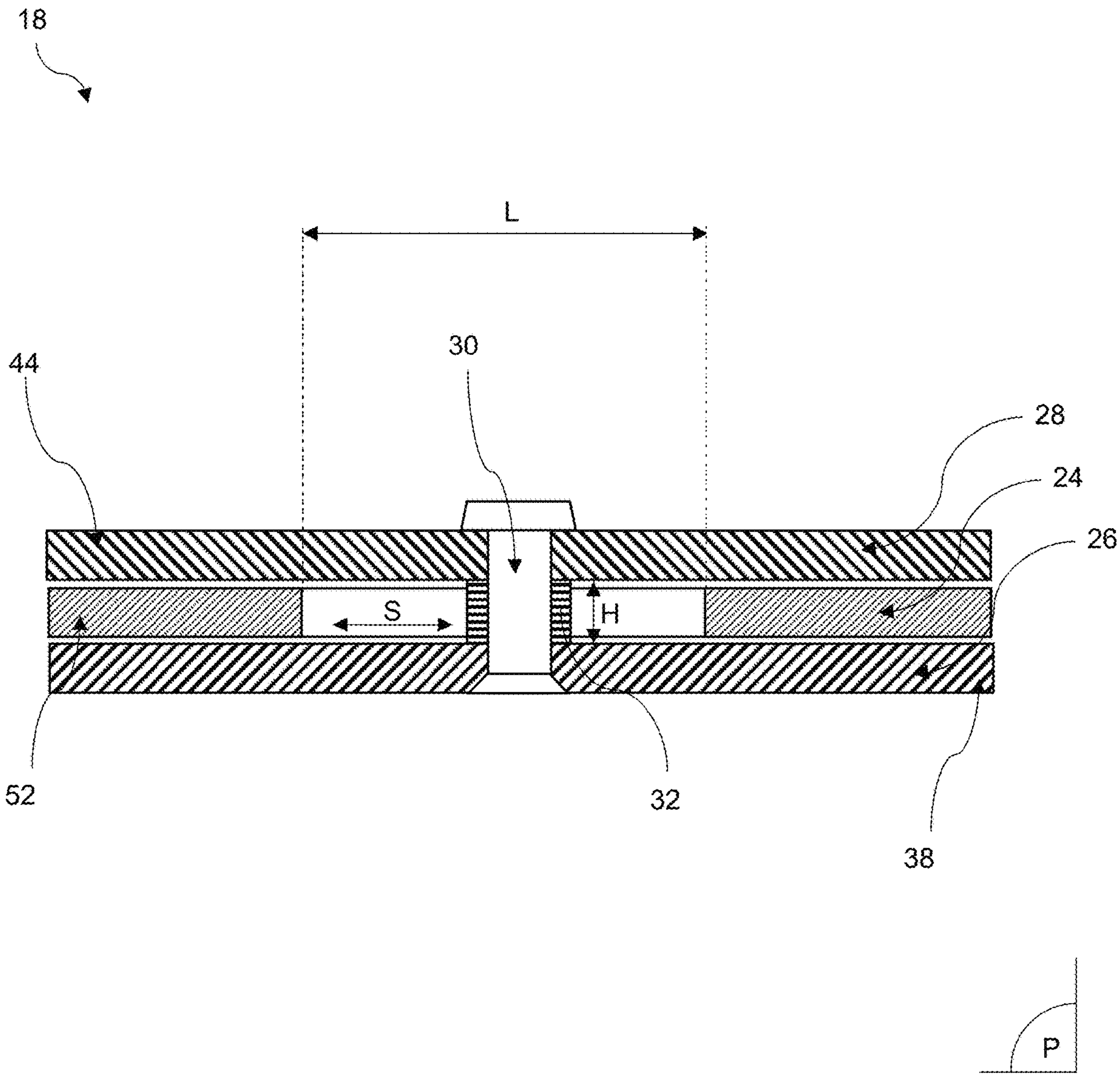
FIG. 3 is a detailed schematic sectional view of a slat comprising a slat cove filling device according to an exemplary embodiment.
Figure 5:
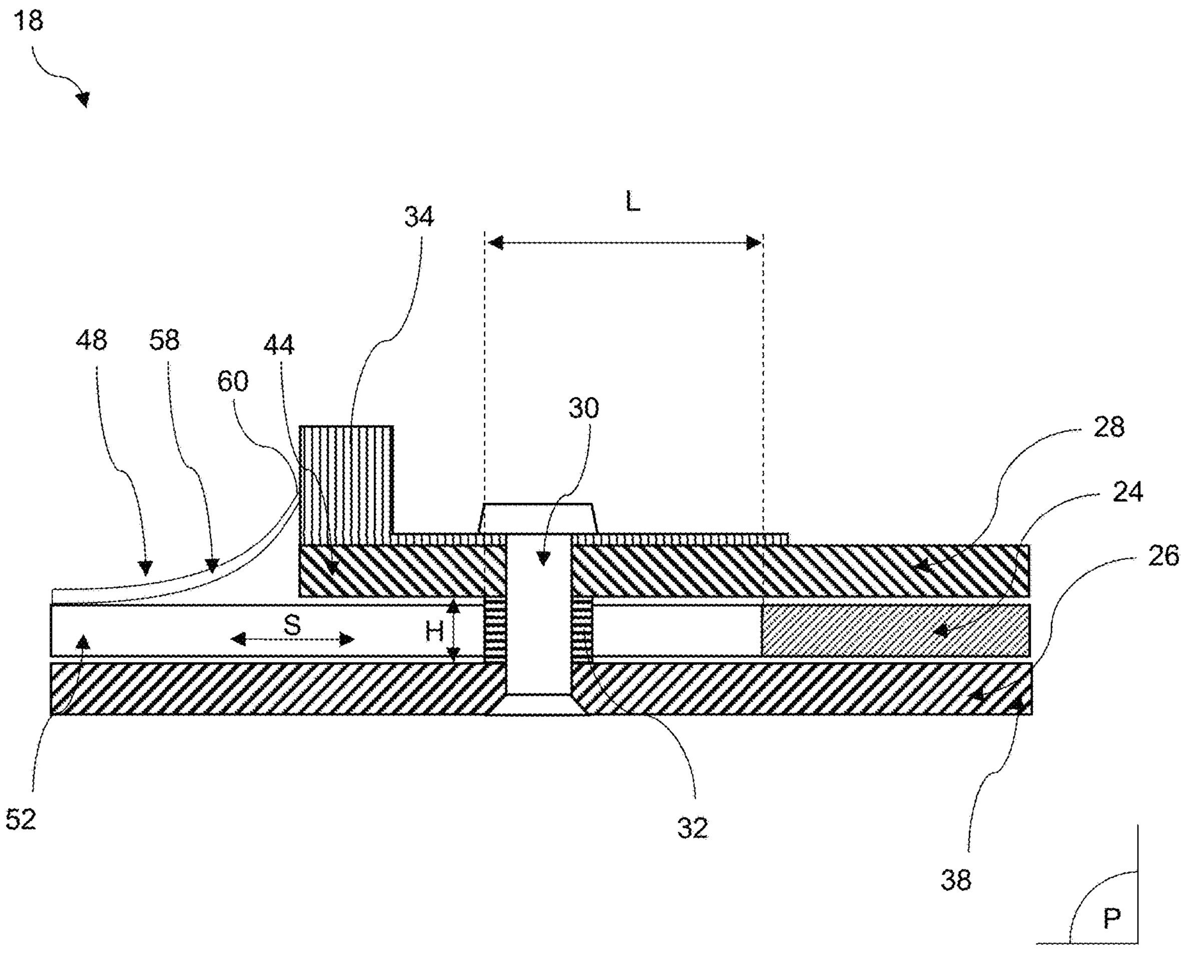
FIG. 5 is a detailed schematic sectional view of a slat comprising a slat cove filling device according to an exemplary embodiment.

As visible from FIG. 2 and from the detailed illustrations of FIGS. 3 and 5, the slat body 22 comprises an external skin 26 and an internal skin 28.

The slat body 22 also comprises a plurality of guiding elements 30. For example, the slat body 22 further comprises at least one spacer 32 and at least one blocking element 34.

The external skin 26 is for example forming a leading edge of the slat 18. The external skin 26 is then for example arranged upstream the internal skin 28 relatively to the ambient flow F.

The external skin 26 is for example formed by a curved panel and/or comprises for example a first edge 36 and a second edge 38, both the first 36 and second edge 38 extending substantially along the spanwise direction Y.

As visible from FIG. 2, the external skin 26 is defines for example a cavity 40.

The internal skin 28 extends for example at least in the cavity 40 defined by the external skin 26.

The internal skin 28 is for example formed by a curved panel and/or comprises for example a first edge 42 and a second edge 44, both the first 42 and second edge 444 extending substantially along the spanwise direction Y.

The internal skin 28 is for example defining together with the external skin 26 an internal volume V of the slat body 22.

Furthermore, as visible from FIG. 2, the internal skin 28 is for example curved such that it defines a slat cove 41 on a side of the internal skin 28 being opposite to the internal volume V. In particular, and in other words, the slat cove 41 is a concave region define by the internal skin 28 on the side of the internal skin 28 being opposite to the external skin 26.

As illustrated from FIG. 2, the internal skin 28 is for example curved along a profile comprising a plurality of inflexion point, such that the curve for example defines the slat cove 41 but also such that the first 42 and second 44 edges can be connected to the external skin 26 in regions where the external skin 26 and the internal skin 28 are substantially parallel, as this will be presented later.

As this will be presented later, the slat cove 41 is configured for receiving at least a portion of the fixed wing portion 16, at least when the slat 18 is in its stowed position.

As visible from FIG. 2, the internal skin 28 extends for example across the cavity 40 and connects for example the first 36 and second 38 edges of the external skin 26.

The first edge 36 of the external skin 26 is for example connected to the first edge 42 of the internal skin 28 and the second edge 38 of the external skin 26 is for example connected to the second edge 44 of the internal skin 28, as illustrated by dashed lines on FIG. 2. One understands for example here that the term edge is to be understood as portions of the skins 26, 28 being adjacent to ends of the skins 26, 28.

For example, the first edge 36 of the external skin 26 is in contact with the first edge 42 of the internal skin 28, said first edges 36, 42 being for example bolted and/or welted together.

For example, the second edge 38 of the external skin 26 and the second edge 44 of the internal skin 28 are connected by a connection element (non-referenced) and, as this will be presented in more details later, are for example connected by the guiding element 30.

As this will be presented in more details later, the guiding element 30 is configured for cooperating with the slat cove filling device 24 for guiding the slat cove filling device relative to the slat body 22.

Furthermore, and for example, as illustrated in FIGS. 3 and 5, the guiding element 30 is connecting the internal skin 28 and the external skin 26.

For example, the guiding element 30 is formed by a bolt extending through the internal skin 28 and the external skin 26. For example, and as illustrated in FIGS. 3 and 5, the bolt is flush relative to an outer face (non-referenced) of the external skin 26.

The spacer 32 is arranged between the internal skin 28 and the external skin 26.

As visible from FIGS. 3 and 5, the spacer 32 is for example configured to space the internal skin 28 apart from the external skin 26.

In particular, as for example illustrated in FIGS. 3 and 5, the spacer has a height H such that the distance between the distance between the second edge 38 of the external skin 26 and the second edge 44 of the internal skin 28 is substantially equal the height H.

The height H of the spacer 32, that is the distance between the second edge 38 of the external skin 26 and the second edge 44 of the internal skin 28, is for example comprise between 3 mm and 30 mm.

For example, the slat body 22 comprises a plurality of spacers 32. In particular, as presented in the example of FIGS. 3 and 5, each spacer 32 is for example arranged around one of the guiding elements 30.

As illustrated in FIG. 2, the slat cove filling device 24 is for example arranged between the slat body 22 and the fixed wing portion 16. As this will be presented in more details later, the slat cove filling device 24 is for example configured for cooperating with the fixed wing portion 16, at least when the slat 18 is in its stowed position.

As presented in FIGS. 2 to 6, the slat cove filling device 24 comprises a sheltering panel 46. In some examples, the slat cove filling 24 device further comprises at least one limiting element 48.

The sheltering panel 46 extends along a spanwise direction, the spanwise direction corresponding for example to the spanwise direction Y of the slat. In the rest of the description the spanwise direction of the wing 14, of the slat 18 and of the sheltering panel 46 are generically referred to as spanwise direction Y.

The sheltering panel 46 comprises for example a proximal edge 50 and a distal edge 52. Both the proximal edge 50 and the distal edge 52 are for example extending substantially along the spanwise direction Y.

For example, the distal edge 52 is further away from the fixed wing portion 16 than the proximal edge 50. For example, as understood from FIG. 2, the distal edge 52 is arranged at an intrados region (non-referenced) of the wing 14 and the proximal edge 50 is arranged at an extrados region (non-referenced) of the wing 14.

Figure 4:
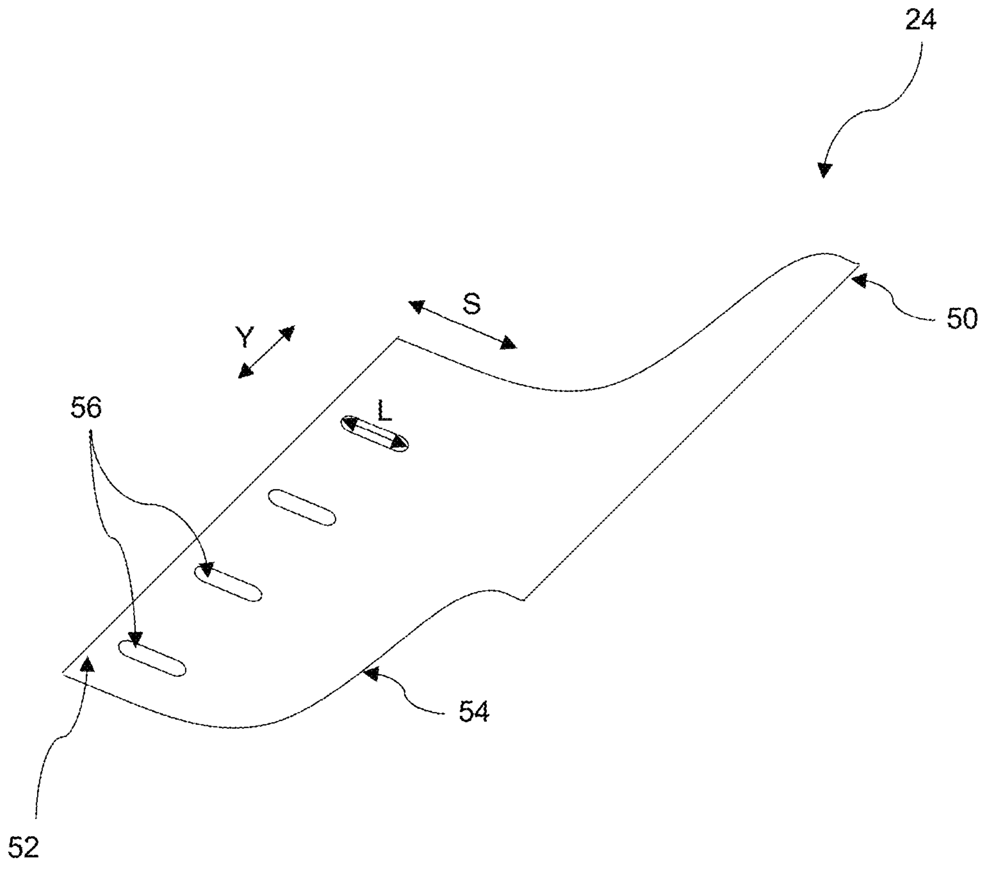
FIG. 4 is a schematic perspective view of the slat cove filling device presented in FIG. 3.
Figure 6:
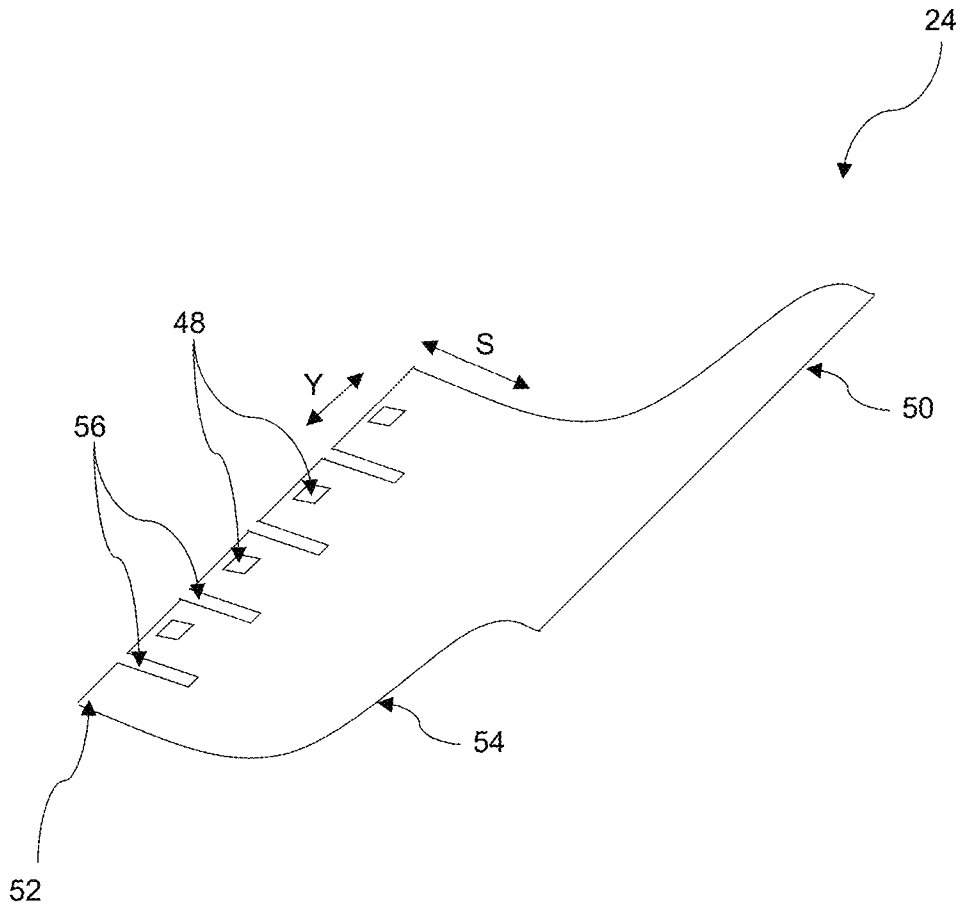
FIG. 6 is a schematic perspective view of the slat cove filling device presented in FIG. 5.

As visible from FIG. 2, and from FIGS. 4 and 6, the sheltering panel 46 is formed by a curved panel. For example, the profile of the curve defining the sheltering panel 46 is substantially of sigmoidal shape.

As visible from FIG. 2, the sheltering panel 46 is for example defining a concave region 54 facing the slat cove 41. The sheltering panel 46 is thus for example defining, together wing the internal skin 28, a closed cove region R. As illustrated from FIG. 2, the slat cove 41 is arranged in the closed cove region R when the slat is in a deployed position.

The sheltering panel 46 is for example flexible. In particular, the sheltering panel 46 is for example configured to be deformable between the slat body 22 and the fixed wing portion 16 upon displacement of the slat body relative to the fixed wing portion of the aircraft.

The shape of the sheltering panel 46 depends for example of the position of the slat body 22 relative to the fixed wing portion 16. For example, the shape of the sheltering panel 46 is different when the slat 18 is in its deployed position and when the slat is in its stowed position.

In particular, as understood from FIG. 2, the slat cove filling device 24 is for example configured to cooperate with the fixed wing portion 16 such that the slat cove filling device is deformed.

The shape of the closed cove region R is then for example depending on the position of the position of the slat body 22 relative to the fixed wing portion 16.

As presented above, the slat cove 41 is arranged within the closed cove region R when the slat is in a deployed position. However, the fixed wing portion 16 is example configure to deform the sheltering panel 46 such that the fixed portion 16 can be hosted in the slat cove 41 when the slat 18 is in its stowed position. In other words, the fixed wing portion 16 is pushing the sheltering panel 46 towards the slat body 22 when the slat 18 is moved towards its stowed position, the size of the closed cove region R being reduced and the fixed wing portion 16 being thus able to occupy the slat cove 41.

The proximal edge 50 of the sheltering panel 46 is fastened to the slat body 22. For example, the proximal edge 50 is bolted and/or welded to the slat body 22.

In particular, as presented in FIG. 2, the sheltering panel 46 is for example fastened to the internal skin 28 of the slat body 22. For example, the proximal edge 50 of the sheltering panel 46 is fastened to the first edge 42 of the internal skin 28.

The sheltering panel 46 configured for being slidable relating to the slat body 22.

In particular, the distal edge 52 is configured for being slidable relative to the slat body 22.

As visible from FIGS. 3 to 6, the sheltering panel comprises a plurality of guiding passages 56.

Each guiding passage 56 is configured for cooperating with a guiding element 30 of the slat body 22.

As this will presented in more details later on, each guiding passage 56 is in particular configured for cooperating with a guiding element 30 for guiding the distal edge 52 of the sheltering panel 46 along a sliding direction S relative to the slat body 22.

As understood from FIGS. 3 and 5, each guiding element 30 is for example configured for cooperating with one of the guiding passages 56 through one of the spacers 32 for guiding the distal edge 52 along the sliding direction S relative to the slat body 22. In a non-illustrated example, each guiding element 30 is configured for cooperating directly with one of the guiding passages 56 for guiding the distal edge 52 along the sliding direction S relative to the slat body 22.

As visible from FIGS. 4 and 6, the guiding passages 56 are for example elongated the sliding direction S. In particular, the guiding passages 56 are for example defining the sliding direction S such that the sliding passages 56 are aligned with the sliding direction S.

The sliding direction S is for example substantially perpendicular to the spanwise direction Y.

As illustrated in FIGS. 4 and 6, the plurality of guiding passages 56 is adjacent to the distal edge 52. Each guiding passage 56 is for example formed by an elongated hole or a notch.

In particular, in the example of FIG. 4, every guiding passage 56 is formed by an elongated hole. In the example of FIG. 6, every guiding passage 56 is formed by a notch.

In a non-illustrated example, the guiding passages 56 are formed by both elongated holes and notches.

The distal edge 52 is for example configured for sliding relative to the slat body 22 upon moving the slat 18 between its deployed and stowed positions relative to the fixed wing portion 16. For example, the fixed wing portion 16 is configured for cooperating with the sheltering panel 46 such that the distal edge 52 is moved relative to the slat body 22 and guided along the sliding direction S by the cooperation between the guiding elements 30 and the guiding passages 56.

The sheltering panel 46 is for example configured to slide between the internal skin 28 and the external skin 26 such that the distal edge 52 is sliding relative to the slat body 22. In particular, the sheltering panel 46, is configured for sliding between the second edge 38 of the external skin 26 and the second edge 44 of the internal skin 28.

The thickness of the sheltering panel 46, and for example of the distal edge 52 of the sheltering panel 46 is for example comprises between 75% and 99% of the distance between the distance between the second edge 38 of the external skin 26 and the second edge 44 of the internal skin 28, that is for example between 75% and 99% of the height H of the spacer.

As this will be presented in more details later, the sliding of the distal edge 52 relative to the slat body 22 is limited to a guiding length L. For example, the guiding length L is comprised between 50 mm and 1000 mm.

In the example of FIGS. 3 and 4, in which each guiding passage 56 is an elongated hole, the displacement of the sheltering panel 46 relative to the slat body is for example limited by the length of the elongated hole along the sliding direction S, which corresponds for example to the guiding length L.

In some examples, and as above mentioned, the slat cove filling device 24 comprises at least one limiting element 48 and/or the slat body 22 comprises at least one blocking element 34.

The displacement of the sheltering panel 46 relative to the slat body 22 is for example limited by the limiting element 48 and/or the blocking element 34.

In particular, in the example presented in FIGS. 5 and 6, in which the guiding passages 56 are formed by notches, the slat cove filling device 24 comprises for example at least one limiting element 48 and the slat body 22 comprises at least one blocking element 34. In particular, in the example of FIGS. 5 and 6, the slat cove filling device 24 comprises for example a plurality of limiting element 48 and the slat body 22 comprises at one blocking element 34.

In this example, and as presented on FIG. 5, the guiding length L is for example limited by an end of the notch (not referenced) and the limiting element 48.

As visible from FIG. 5, the blocking element 34 is connected to the internal skin 28 and is configured for cooperating with the slat cove filling device 24 for blocking displacement of the slat cove filling device 24 along the sliding direction S. For example, the blocking element 34 is configured for cooperating with the limiting element(s) of the slat cove filling device 24.

In the example of FIG. 5, the blocking element 34 is formed by a L shaped profile fastened to the internal skin 28. In particular, in the example of FIG. 5, the blocking element is fastened to the slat body with at least one of the guiding elements 30, the guiding element 30 being in this example, and as presented above, formed by a bolt.

As visible from FIGS. 5 and 6, the limiting element 48 is connected to the sheltering panel 46 and is configured for cooperating with the slat body 22 to limit the displacement to limit displacement of the distal edge 52 relative to the slat body 22 along the sliding direction S. For example, the limiting element 48 is configured for cooperating with the blocking element(s) 34 of the slat body 22.

In the example presented in FIG. 5, each limiting element 48 comprises an elastic tongue 58.

As illustrated from FIG. 5, each elastic tongue 58 protrudes for example from the sheltering panel 46 in the direction of the internal skin 28 and or in the direction of the blocking element 34.

As illustrated in FIG. 5, a tip 60 of the elastic tongue 58 is for example configured for cooperating with the slat body 22, for example with the blocking element 34 of the slat body 22, to limit the displacement of the distal edge 52 relative to the slat body 22.

In the above mentioned non-illustrated example in which the guiding passages 56 are formed by both elongated holes and notches, the displacement of the sheltering panel 46 relative to the slat body 22 is for example limited by the length of the elongated holes forming the guiding passages 56. For example, the guiding element 30 arranged in guiding passages 56 formed by notches firmly fasten the internal skin 28 to the external skin 26 and the guiding element 30 arranged in guiding passages 56 formed by elongated holes releasably fasten the internal skin 28 to the external skin 26. In other words, the guiding elements 30 passing through notches ensure fastening the internal skin 28 to the external skin 26 while making installation of the sheltering panel 46 possible on the slat body 16, the guiding elements 30 passing through elongated holes being installable after proper positioning of the sheltering panel 46 relative to the slat body 22 and ensuring, upon installation, a limited displacement of the sheltering panel 46 relative to the slat body 22.

A method of reconfiguring a wing 14 comprising slat 18 as above described will now be presented.

The method comprises a moving step, in which the slat 18 is moved relatively to the fixed wing 16 portion between its deployed and stowed positions.

The method comprises further comprises, for example, a deforming step, in which the sheltering panel 46 of the slat cove filling device 24 is deformed between the fixed wing portion 16 and the slat body 22. The deforming is for example resulting from the cooperation between the slat cove filling device 24 and the fixed wing portion 16, which are moved one relative to another as a result of the moving step.

The method further comprises a sliding step, in which the distal edge 52 of the sheltering panel 46 of the slat cove filling device 24 is sliding relatively to the slat body 22.

The sliding of the distal edge 52 is guided along the sliding direction S relative to the slat body 22, the sliding direction S being, as above mentioned, defined by the guiding passages 56 of the sheltering panel 46.

For example, during the sliding step, the sheltering panel 46 is sliding between the internal skin 28 and the external skin 26 such the distal edge 52 is guided along the sliding direction S relative to the slat body 22.

As presented above, the use of a slat cove filling device 24 in which guiding passages 56 are configured for guiding the distal edge 52 along the sliding direction S is especially advantageous for providing a robust and aerodynamically efficient slat cove filling device 24.

Using a sheltering panel 46 which is flexible is especially advantageous since the deformation of sheltering panel 46 ensures that the slat 18 can be moved relatively to the fixed wing portion 16, while ensuring that the slat cove 41 is filled/sheltered when the slat 18 is for example in a deployed position.

Having guiding passages 56 elongated along the sliding direction S and having a sliding direction S perpendicular to the spanwise direction Y is especially advantageous to provide a proper guiding of the slat cove filling device 24.

Having guiding passages 56 which are formed by elongated holes or notch allows for example limiting the displacement of the slat cove filling device 24 relative to the slat body 22.

The use of a limiting element 48, for example of an elastic tongue 58 and/or of a blocking element 34, is for example particularly advantageous to robustly and/or smoothly limit the displacement of the slat cove filling device 24 relative to the slat body 22. The elastic tongue 58 is also further advantageous in that the tongue 58 can elastically deform to allow installation of the slat cove filling device 24 in the slat body 22 before the elastic tongue 58 is actually acting as a limiting element 48, thus improving ease of installation.

The sliding of the sheltering panel 46 between the internal 28 and the external 26 skins is especially advantageous to further improve the accuracy of the guiding.

The use of at least one guiding element 30 which is connecting the internal 28 and the external 26 skins makes the assembly of the slat 18 especially easy.

The spacer 32 arranged between the internal 28 and the external 26 skins ensures a proper control of the distance between the internal 28 and the external 26 skins, thus ensure an optimal sliding of the sheltering panel 46 relative to the slat body 22.

The invention claimed is:

1. A slat cove filling device for a slat of an aircraft, comprising:

a sheltering panel extending along a spanwise direction and comprising a proximal edge, configured for being fastened to a slat body of the slat, and a distal edge, configured for being slidable relative to the slat body, wherein the sheltering panel comprises a plurality of guiding passages, wherein each guiding passage is configured for cooperating with a guiding element of the slat body for guiding the distal edge along a sliding direction (S) relative to the slat body.

2. The slat cove filling device according to claim 1, wherein the sheltering panel is flexible and configured for being deformable between the slat body and a fixed wing portion of the aircraft upon displacement of the slat body relative to the fixed wing portion of the aircraft.

3. The slat cove filling device according to claim 1, wherein the guiding passages are elongated along the sliding direction (S), the sliding direction (S) being substantially perpendicular to the spanwise direction (Y).

4. The slat cove filling device according to claim 1, wherein the plurality of guiding passages is adjacent to the distal edge, each guiding passage being formed by an elongated hole or a notch.

5. The slat cove filling device according to claim 1, wherein the slat cove filling device further comprises at least one limiting element, the limiting element being connected to the sheltering panel and configured for cooperating with the slat body to limit displacement of the distal edge relative to the slat body along the sliding direction (S).

6. The slat cove filling device according to claim 5, wherein the limiting element comprises an elastic tongue, a tip of the elastic tongue is configured for cooperating with the slat body to limit the displacement of the distal edge relative to the slat body.

7. A slat, comprising:

the slat cove filling device according to claim 1, and a slat body, wherein the proximal edge of the sheltering panel of the slat cove filling device are fastened to the slat body and the distal edge of said sheltering panel being slidable relative to the slat body, wherein the slat body comprises a plurality of guiding elements, each guiding passage of the sheltering panel is configured for cooperating with one of the guiding elements for guiding the distal edge along the sliding direction (S) relative to the slat body.

8. The slat according to claim 7, wherein the slat body further comprises an external skin and an internal skin, the sheltering panel is configured to slide between the internal and the external skins such that the distal edge is sliding relative to the slat body.

9. The slat according to claim 8, wherein at least one of the guiding elements is connecting the internal and the external skins.

10. The slat according to claim 8, wherein the slat body further comprises at least one spacer, the spacer is arranged between the internal skin and the external skin to space the internal skin apart of the external skin.

11. The slat according to claim 10, wherein the slat body further comprises a plurality of spacers, each spacer being arranged around one the guiding elements, each said guiding element is configured for cooperating with one of the guiding passages through said spacer for guiding the distal edge along the sliding direction (S) relative to the slat body.

12. The slat according to claim 7, wherein the slat body further comprises at least one blocking element, the blocking element is connected to the internal skin and being configured for cooperating with the slat cove filling device for blocking displacement of the slat cove filling device along the sliding direction (S).

13. A wing, comprising:

the slat according to claim 7, and a fixed wing portion, wherein the slat is moveable relatively to the fixed wing portion between and deployed position and a stowed position, wherein the distal edge of the sheltering panel of the slat cove filling device is configured for sliding relatively to the slat body upon moving the slat between its deployed and stowed positions.

14. An aircraft comprising the wing according to claim 13.

15. A method of reconfiguring the wing according to claim 13, comprising:

moving the slat relatively to the fixed wing portion between its deployed and stowed positions, and sliding of the distal edge of the sheltering panel of the slat cove filling device relatively to the slat body, the sliding of the distal edge being guided along a sliding direction (S) relative to the slat body, the sliding direction (S) being defined by the guiding passages of the sheltering panel.

* * * * *